United States Patent [19]

Ackerman

[11] 4,116,314

[45] Sep. 26, 1978

[54] OVER RUNNING CLUTCH

[76] Inventor: Leonard Stanley Ackerman, 355 Lakeview Ave., Rockville Center, N.Y. 11570

[21] Appl. No.: 774,175

[22] Filed: Mar. 3, 1977

[51] Int. Cl.² ............................................. F16D 41/12
[52] U.S. Cl. ........................................ 192/46; 192/35; 192/55; 74/577 S
[58] Field of Search ............... 192/35, 46, 55; 74/576, 74/577 S

[56] References Cited

U.S. PATENT DOCUMENTS

| 236,656 | 1/1881 | Warren | 192/46 |
|---|---|---|---|
| 2,308,926 | 1/1943 | Kreis | 192/46 |
| 3,505,890 | 4/1970 | Peterson | 192/46 X |

FOREIGN PATENT DOCUMENTS 524,222  5/1921  France ...................................... 192/55

*Primary Examiner*—Allan D. Hermann
*Attorney, Agent, or Firm*—Frederick W. Turnbull

[57] ABSTRACT

An over running clutch having a ball that wedges against the interior of a circular race to move a pawl into engagement with a ratchet.

3 Claims, 5 Drawing Figures

OVER RUNNING CLUTCH

Over running clutch devices are known in which one or more balls, rollers or sliding blocks are positioned between an inner and and outer coaxial rotatable element one of which is cylindrical and the other formed with a wedging face such that, upon relative rotation of one of the elements in one direction, the ball, roller or block will wedge between the two elements so they rotate together or, if the one element is rotated in the other direction the ball, roller or block will be moved so as not to wedge the two rotatable elements so one element may over-run the other.

In such devices, however, the weding of the balls, etc. between the rotatable elements creates a bursting stress against the outer rotatable element, and a sudden clutching of the device is equivalent to a heavy hammer blow tending to burst the outer element.

It is an object of the present invention to provide an over running device which is operated by a ball wedging a pawl against a ratchet wheel when the driving element rotates in the driving direction and releases the pawl from the ratchet wheel when the driven element over runs the driving element, or upon reverse of the direction of rotation of the driving element.

Other and further objects and advantage will appear from the following specification taken with the accompanying drawings in which like reference characters refer to similar parts in the several views and in which.

Figure 1:
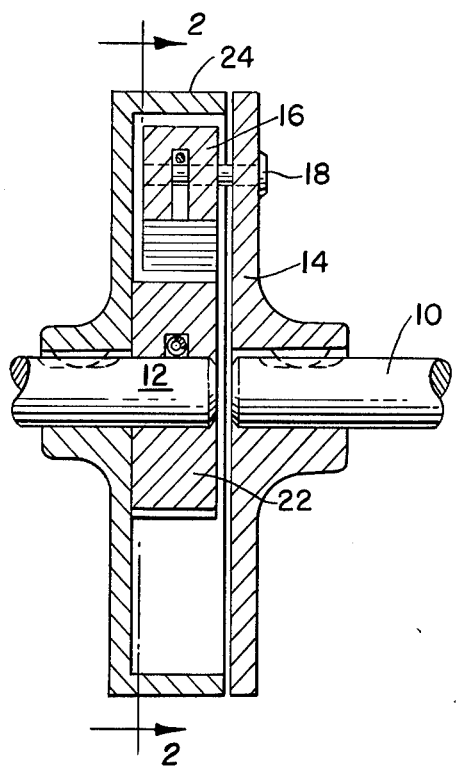
FIG. 1 is a section of the device taken on line 1—1 of FIG. 2.
Figure 2:
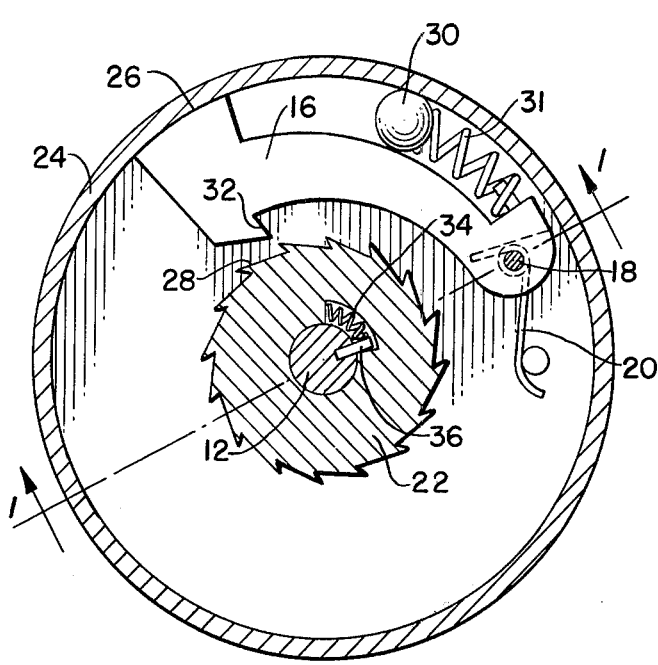
FIG. 2 is a section taken on line 2—2 of FIG. 1.
Figure 3:
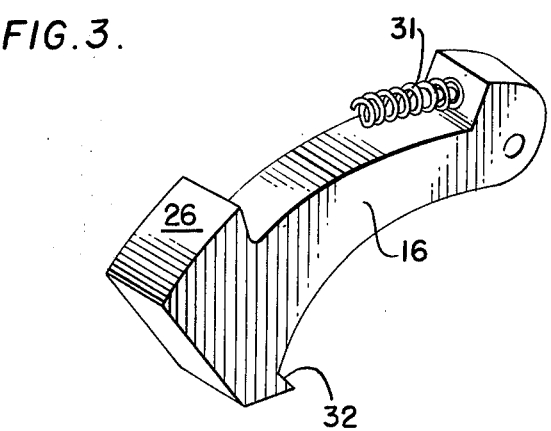
FIG. 3 is a perspective view of the pawl element of the device.

As seen in FIG. 1 shaft 10 may be considered to be the driving shaft, and shaft 12 the driven shaft. Shaft 10 carries a flange 14 on which a pawl 16 is pivoted at 18. Pawl 16 is lightly biased outwardly by a spring 20, as seen in FIG. 2. It will be seen, then, that when the device is in a position such as shown in FIG. 2 pawl 16 will not fall into engagement with ratchet 22.

Shaft 12 carries ratchet wheel 22 to lie radially inwardly of pawl 16, and also carries a cup shaped element 24 that provides an interior race radially outwardly of pawl 16 against which face 26 of pawl 16 engages when it is not urged into engagement with the teeth 28 ratchet 22.

A ball 30 is positioned between pawl 16 and race 24. The outer surface of pawl 16, when surface 26 lies against the race 24, is such that as ball 30 moves toward the end 26 of pawl 16 the pawl is wedged radially inwardly to bring tooth 32 of pawl 16 into engagement with a tooth 28 of ratchet 22. A spring 31 provides a bias only strong enough that ball 30 cannot fall out of contact with pawl 16 and race 24 when the shaft 12 is over running shaft 10.

If tooth 32 of pawl 16 strikes a tooth 28 of ratchet 22 at the very tip of the tooth, the relative motion between pawl 16 and ratchet 22, ratchet 22 would then stop and the entire torque from shaft 12 would fall on the very tip of the tooth 28.

To avoid this danger provision is made by use of a spring 34 in an arcuate space about shaft 12 that bears against a key 36 in shaft 12 so that when the tip 32 contacts the tip of ratchet tooth 28, the ratchet tooth 28, moving with ratchet wheel 22 moves along with the tip 32 of the pawl under a fairly light load which will increase as the pawl moves radially inwardly under the influence of ball 30. Tip 32, then, if it strikes near the end of tooth 28 will slide down in face to face contact with the tooth until the pawl is seated behind a tooth 28. This especially as teeth 28 and pawl 32 have a slight rearward rake. (exagerated in the drawings)

If pawl tip 32 strikes the tip surface of a tooth 28 it will slide down the tip surface until pawl 32 is in face to face contact with a tooth 28 because the friction between the pawl and the top surface of a tooth 28 cannot build up because ratchet wheel 22 will not follow pawl 32 until pawl 32 strikes the radial face of a tooth 28.

Figure 4:
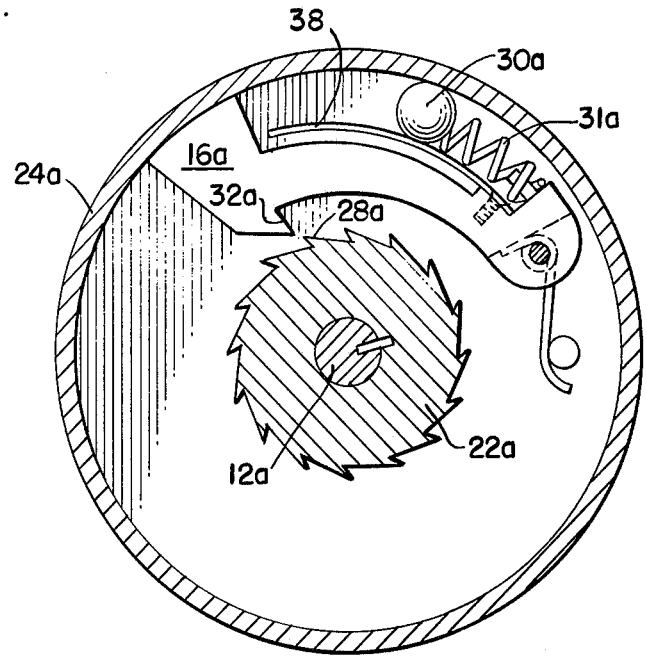
FIG. 4 is a section similar to FIG. 2 of a modified device.
Figure 5:
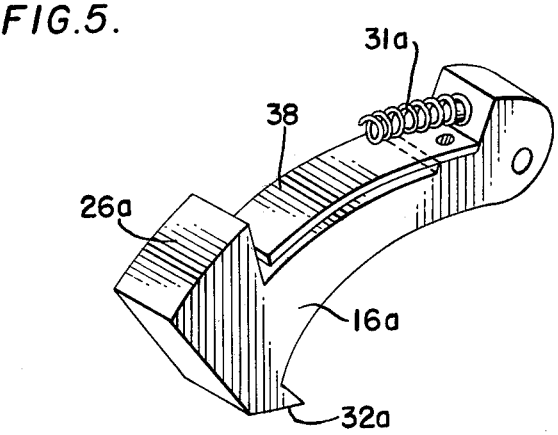
FIG. 5 is a view similar to FIG. 3 showing the modified pawl element used in FIG. 4.

In FIG. 4 ratchet 22a is keyed to shaft 12 but the radially outwardly facing surface of pawl 16a is provided by a flat spring element 38. As pawl 16a is moved in the clockwise direction in FIG. 4, ball 30a presses pawl 16a toward ratchet wheel 22a. If the tip 32a strikes the outer end of a tooth 28a it will, of course, start to rotate ratchet wheel 22a clockwise. It will be noted, however, that teeth 28a, like teeth 28, have a slightly rearwardly sloping face (exagerated in the drawings) and tip 32a has a correspondingly forward sloping face so that, as ball 30, pressing on spring 38 increases its inward pressure the pawl can move inwardly because the resistance to inward movement is not increased by such movement.

If pawl 32a strikes the outer surface of a ratchet tooth 28a near its point, it will not at first be under any very heavy pressure from spring 38 so it will slide down the outer surface of the tooth 28a under increasing pressure as spring 38 is compressed. If, however, for some reason pawl tooth 32a does not slide down the outer surface of the tooth, it still can not exert a bursting stress on race 24a in excess of the strength of spring 38. When pawl 32 or 32a is in face to face contact with a tooth 28, or 28a respectively, no bursting stress will be exerted by ball 30 or 30a on pace 24 or 24a respectively, and unlike known wedging ball over running clutches, the driving and driven elements are positively engaged instead of relaying on friction due to a heavy stress between the two rotating elements and the wedging element.

Having thus disclosed my invention, I claim:

1. An over running pawl and ratchet device comprising a ratchet wheel mounted on a first shaft and having ratchet teeth about its periphery, a coaxial race surrounding but spaced from said ratchet wheel, a second rotatable shaft, a pawl mounted on said second rotatable shaft coaxial of said ratched wheel between said ratchet wheel and said race, means biasing said pawl away from said ratchet wheel, a movable element between said pawl and said race, the outer surface of said pawl being so shaped that as said second shaft is rotated in one direction, said movable element contacting both said race and the outer surface of said pawl, wedges said pawl radially inwardly into engagement with said ratchet wheel.

2. The over running pawl and ratchet device of claim 1 in which said ratchet wheel is keyed to said first shaft and said pawl includes a spring element as its outer face whereby the maximum inward force that can be developed by said movable element is limited to the strength of said spring element.

3. The over running pawl and ratchet device of claim 1 in which spring means is interposed between said first shaft and said ratchet wheel permitting limited rotation of said ratchet wheel with respect to said first shaft in the direction in which said pawl will drive said ratchet wheel.

* * * * *